(12) United States Patent
Dougherty et al.

(10) Patent No.: US 6,757,626 B2
(45) Date of Patent: Jun. 29, 2004

(54) TRIP UNIT AND CIRCUIT BREAKER TO PREVENT NUISSANCE TRIPPING

(75) Inventors: John James Dougherty, Collegeville, PA (US); Michael Sullivan Tignor, Watertown, CT (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/249,111

(22) Filed: Mar. 17, 2003

(65) Prior Publication Data
US 2003/0125885 A1 Jul. 3, 2003

Related U.S. Application Data

(62) Division of application No. 09/683,289, filed on Dec. 10, 2001, now Pat. No. 6,546,342.

(51) Int. Cl.[7] ................................................ H02H 3/00
(52) U.S. Cl. ............................ 702/58; 702/57; 702/64; 361/42
(58) Field of Search ............................. 702/57–59, 64, 702/65, 71, 72, 117, 118, 122, 124, 126, 183, 185, 188, 189, 193, FOR 103, FOR 104, FOR 106, FOR 110, FOR 154, FOR 170, FOR 171; 324/509, 510; 700/292–294; 361/42–48, 78, 79, 85, 87, 93.1, 93.2, 93.3, 93.9, 95, 96, 115; 340/638, 649–652, 664, 658

(56) References Cited

U.S. PATENT DOCUMENTS

| | | | |
|---|---|---|---|
| 5,490,086 A | 2/1996 | Leone et al. ................. 364/492 |
| 5,627,717 A | 5/1997 | Pein et al. ..................... 361/95 |
| 5,768,079 A | * 6/1998 | Buell ............................ 361/78 |
| 5,793,587 A | 8/1998 | Boteler ........................ 361/42 |
| 6,262,872 B1 | 7/2001 | Messerli et al. ........... 361/93.2 |
| 6,292,717 B1 | * 9/2001 | Alexander et al. .......... 700/293 |
| 6,327,124 B1 | 12/2001 | Fearing et al. ................ 361/31 |
| 6,532,424 B1 | * 3/2003 | Haun et al. .................... 702/58 |

* cited by examiner

Primary Examiner—Hal Wachsman
(74) Attorney, Agent, or Firm—Cantor Colburn LLP

(57) ABSTRACT

A trip unit and circuit breaker including the trip unit include phase protection circuits, a ground fault protection circuit, and, a phase current qualification circuit intermediate the phase protection circuits and the ground fault protection circuit, wherein the phase current qualification circuit includes circuitry for determining a minimum ground fault setting for detected phase currents.

22 Claims, 2 Drawing Sheets

TRIP UNIT AND CIRCUIT BREAKER TO PREVENT NUISSANCE TRIPPING

CROSS REFERENCE TO RELATED APPLICATIONS

This application is a divisional patent application of U.S. patent application Ser. No. 09/683,289, filed on Dec. 10, 2001, now U.S. Pat. No. 6,546,342, which is wholly incorporated by reference in its entirety.

BACKGROUND OF INVENTION

This invention relates generally to ground fault measurement. More particularly, this invention relates to an algorithm to prevent nuisance tripping due to inaccurate ground fault current calculation.

Ground faults are the result of currents flowing through a ground return path. In electrical systems, current should flow from one of the power phases out to the electrical load and return on another power phase or the neutral circuit. The detection of ground fault currents is a common protective mode for high function circuit breakers. The manner that this protection is accomplished varies, but a common approach is to calculate the ground fault current by summing the values of phase and neutral, if in use, currents. In normal, unfaulted use, this signal is zero. If a signal exists, it indicates that some of the current is returning via a ground path. Then, this measured ground fault current is compared to an operator-selected threshold to determine if the circuit breaker should trip.

High level fault currents provide one common source of inaccuracy in a ground fault measurement. When high fault or temporary application currents (for example, motor starting) flow, the small errors due to tolerance or sensor saturation can become relatively large when compared to the ground fault signals that a trip unit attempts to detect. Due to the short trip times customary in ground fault protection, these errors can cause false or nuisance tripping.

A nuisance trip in a circuit breaker can cause expensive processes to shut down. It can have serious ramifications and be very costly. Ground fault protection can be a source of nuisance tripping if the method for determining the ground fault current is, under certain conditions, sufficiently inaccurate.

Inaccurate ground fault current calculations occur when the threshold for ground fault protection is very small compared to the measured phase currents. If the phase currents are sufficiently large and the ground fault threshold is sufficiently small, the error in measuring ground fault current can result in a level that can exceed the specified trip level for a ground fault circuit.

One method used to deal with the inaccuracy noted above is to make the measurement of the phase currents so accurate that the calculated ground fault current is sufficiently accurate. This is difficult and expensive to do especially when large phase currents are used to calculate small ground fault currents. Another method involves eliminating or disabling the ground fault function when fault currents exceed a specified level. This avoids the nuisance tripping but may allow incremental damage in the faulted circuit (due to a longer tripping time), particularly if the high level fault is entirely a ground fault.

SUMMARY OF INVENTION

The above discussed and other drawbacks and deficiencies of the prior art are overcome or alleviated by a trip unit including phase protection circuits, a ground fault protection circuit, and a phase current qualification circuit intermediate the phase protection circuits and the ground fault protection circuit, wherein the phase current qualification circuit includes circuitry for determining a minimum ground fault setting for detected phase currents.

In another exemplary embodiment of the invention, a trip unit includes means for determining a minimum ground fault setting for detected phase currents, means for comparing the minimum ground fault setting to a customer provided threshold, means for determining which of the minimum ground fault setting and the customer provided threshold has a larger value and setting the larger value as a maximum value, and means for utilizing the maximum value as a ground fault threshold.

In another exemplary embodiment of the invention, a circuit breaker includes a plurality of phases, a current transformer for each phase, phase protection circuits receiving signals from each current transformer, a ground fault protection circuit receiving signals from each current transformer, and a phase current qualification circuit intermediate the phase protection circuits and the ground fault protection circuit, wherein the phase current qualification circuit includes circuitry for determining a minimum ground fault setting for detected phase currents.

The above-discussed and other features and advantages of the present invention will be appreciated and understood by those skilled in the art from the following detailed description and drawings.

BRIEF DESCRIPTION OF DRAWINGS

Referring to the exemplary drawings wherein like elements are numbered alike in the several FIGURES.

DETAILED DESCRIPTION

The algorithm of this invention may be implemented in a program that controls the circuit breaker electronic trip unit. The algorithm determines when conditions are such that inaccurate results would occur with calculated ground fault currents. The algorithm then adjusts the tripping threshold higher, and by doing so prevents nuisance tripping.

Figure 1:
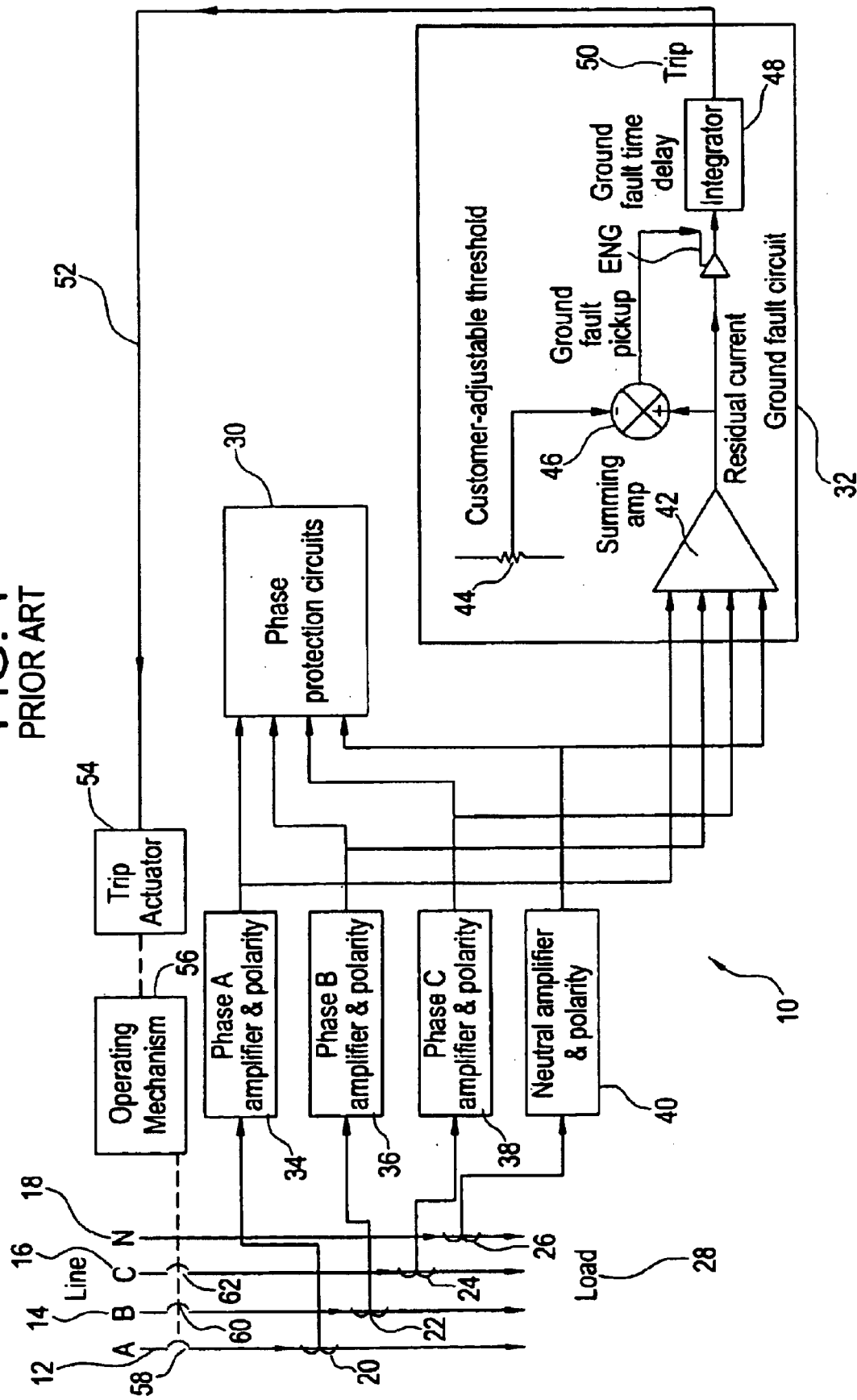
FIG. 1 is a diagrammatic representation of a prior art circuit breaker having ground fault protection.

Referring to FIG. 1, a block diagram of a circuit breaker 10 having a ground fault measurement algorithm is shown. Many elements of an actual circuit breaker are not shown for clarity, and the emphasis for the purpose of describing this invention lies in depicting relative features of the trip unit. Phases A, B, and C (lines 12, 14, and 16) flow through the circuit breaker 10 and a set of current transformers 20, 22, 24 detect current of each respective line 12, 14, and 16. The neutral path N 18, which is typically connected to ground at the source and normally not interrupted by the circuit breaker 10 provides a return path for unbalances in current in a 3 phase system. For ground fault protection, a current transformer 26 must sense the neutral current as well. The outputs of the current transformers 20, 22, 24, and 26 are processed via the phase amplifiers 34, 36, 38, and 40 and provided to the phase protection circuits 30 for overcurrent protection (long time, short time, and instantaneous). These signals are provided to the ground fault circuit 32 as well. The 3 phase signals and neutral are added together (including the polarity of all 4 signals) in the summing amplifier 42. In some alternative implementations, the summing may be performed by a small secondary current transformer. In an electrical system with no ground fault (that is, no inadvertent connection to ground on the load side 28 of the circuit breaker 10), the currents which flow out on any given phase must return to the electrical source via another phase or the neutral. In this case, the sum of the phase currents and neutral must equal zero. If they do not equal zero, the summing amplifier 42 will have an output equal to the difference from zero. In an errorless system, this signal will correspond to the amount of current which flows in the ground fault. The customer can set a level of ground fault above which the tripping algorithm starts (pickup) using a customer adjustable threshold mechanism 44. Although any mechanism for entering the customer adjustable threshold is within the scope of this invention, an exemplary mechanism would include a rotary switch, keypad, or any multiposition switch with switch positions corresponding to settings. The customer adjustable threshold and the residual current are compared in a comparator 46 for determining the ground fault pickup. The signal from the summing amplifier 42 is passed to an integrator 48 and the circuit 32 will generate a trip signal 50 at a time delay which is fixed or proportional to the amount by which the square of the ground fault current exceeds the customer selected threshold.

The trip signal 50 is then passed to a line 52 which may lead to a trip actuator 54 and operating mechanism 56 for opening the contacts 58, 60, and 62 which interrupt the flow of current from the lines 12, 14, 16 to the load 28. The line 52 may further include a microprocessor for receiving the trip signal 52 and setting the trip actuator 54 into motion, such as by the use of a solenoid or other known means of creating a trip action, all of which would be within the scope of this invention.

The ground fault thresholds in industrial circuit breakers can be set typically from 20% to 60% of the circuit breaker capacity. When phase currents are less than 100% of the capacity, small errors in measurement, 2 to 3%, do not affect the ground fault protection. When phase currents reach 300% or 500% of breaker capacity, the same 2% or 3% error, becomes a signal equivalent to 20% of the breaker capacity as the current transformers 20, 22, 24 often perform poorly at higher currents. In this case, a balanced, fault level current may create a false unbalance which causes the ground fault circuit 32 to pickup and operate. If the high phase current is the result of a normal load such as the inrush current of a high efficiency motor, the circuit breaker 10 may erroneously trip when no fault is present.

To avoid this problem, some trip units disable ground fault whenever high fault currents are present. This provides very poor protection when a "hard" ground fault occurs such as a short circuit of a phase directly or indirectly to ground. Due to the poor ground path, the fault may be limited to 300% or 500% of breaker capacity. The normal phase protection circuits 30 will interrupt this fault, but the fault may persist for 10 seconds or more. Equipment damage can occur at these high levels for this delay. The improved circuit breaker and algorithm of this invention avoids both of these problems.

As the exact algorithm will differ by hardware platform tolerances and performance, the procedure for determining the algorithm is preferably as follows: characterize the expected errors in phase current measurement which are not correlated: some errors such as A/D reference error will affect all phase measurements identically; also, current transformer error may be characteristic of an expected error, that is, while the absolute error is +/−3%, the variation in error at a specific point is small, so the error from several current transformers measuring similar currents may cancel somewhat; amplifier offset and resistor tolerance in gain circuits are other exemplary sources of error.

determine the phase current level or levels at which erroneous readings may occur override the customer threshold level to raise the ground fault pickup above the phase current error level whenever any of the phase current measurements exceed the determined levels.

For example, if the phase current measurement has 6% error at 300% of breaker rating, this equates to a ground fault error of 18%, almost equal to a minimum threshold of 20%. When the processor calculating phase current senses this level, the customer threshold may be overridden if it is 20%. The trip unit processor, i.e., the phase current qualification block in FIG. 2, may raise the threshold to 30%. Note in this example, if the phase current of 300% is all ground fault, the ground fault circuit will still detect a ground fault condition (300%>>30%) and trip the circuit breaker quickly. It is important to note that the ground fault protection is not disabled altogether but simply made less sensitive.

Figure 2:
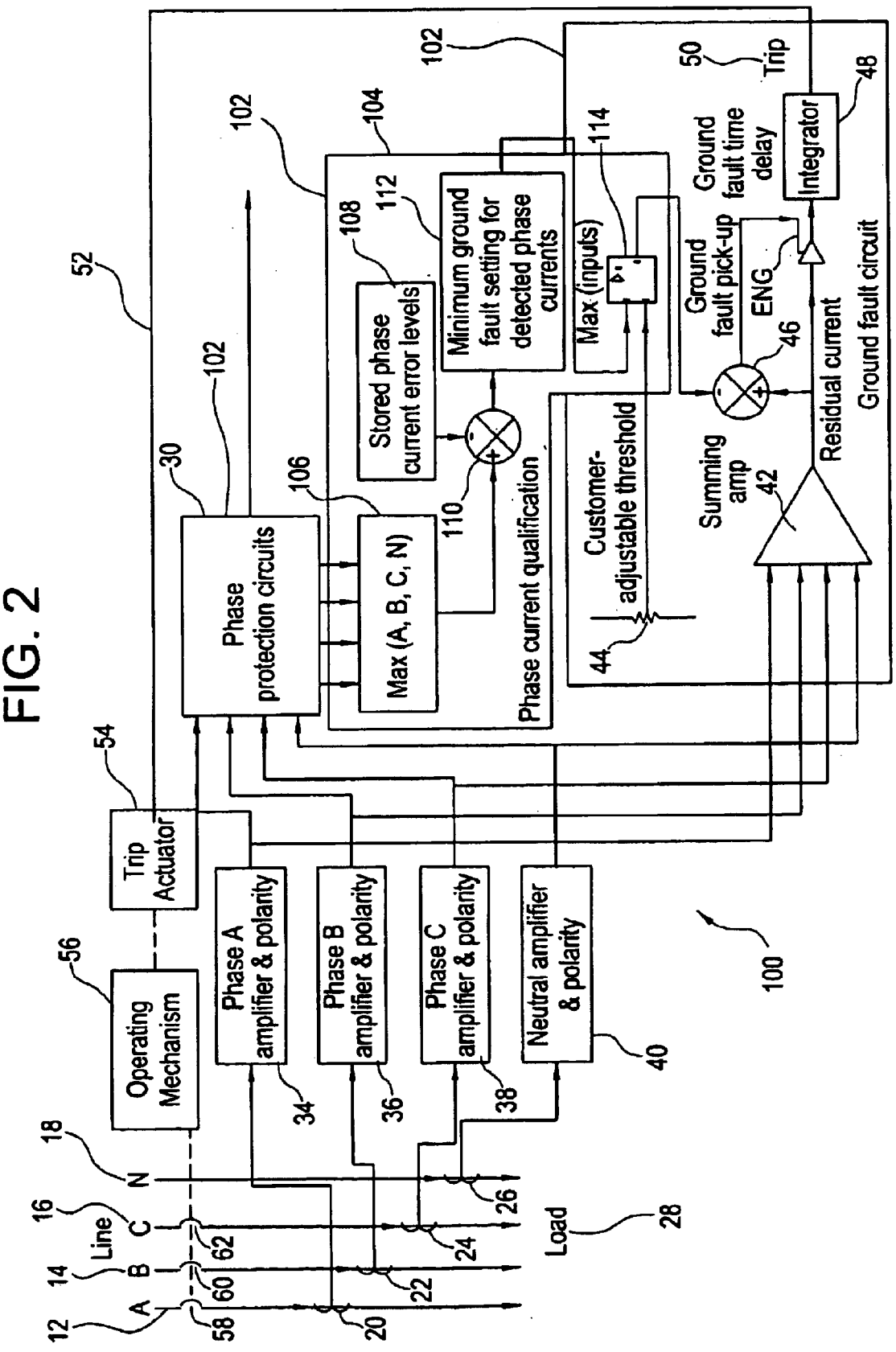
FIG. 2 is a diagrammatic representation of a circuit breaker having ground fault protection with phase current qualification.

FIG. 2 shows the modifications to the trip unit of the circuit breaker 100, in block diagram form. A microprocessor 102 (which encompass the entire phase current qualification circuit, the ground fault circuit, and the phase protection circuits) which must measure the phase currents for phase protection compares the current level with stored values which have high errors. The circuit breaker 100 includes a phase current qualification circuit 104 which receives phase current information from the phase protection circuits 30 and determines the maximum phase current being received by the circuit breaker 100 within the maximum phase current selector 106. The phase current qualification circuit 104 includes storage 108, such as a read only memory or a fixed analog circuit, for storing phase current error levels, that is, values which have been known to have high errors. Both the maximum phase current information and the stored phase current error levels are sent to a summer 110. Depending on the level of the maximum phase current, a minimum ground fault threshold 112 is selected from processor memory 108 (preferably determined offline). Both the customer adjustable threshold 44 and the minimum ground fault threshold 112 are entered into a maximum ground fault threshold selector 114. Thus, the ground fault threshold becomes the maximum of the customer setting and the minimum value that varies with fault current. The remainder of the ground fault circuitry preferably remains the same, that is, the signal from the summing amplifier 42 is passed to an integrator 48 and the circuit 32 will generate a trip signal 50 at a time delay which is fixed or proportional to the amount by which the ground fault current exceeds the customer selected threshold or the minimum ground fault setting, whichever is greater. The trip signal 50 will initiate a trip response to separate the contacts 58, 60, and 62 as previously described.

Note that while this disclosure discusses independent phase and neutral measurements summed electronically and the protection algorithm implemented by a processor, those skilled in the art could, in light of this invention, employ summing transformers and analog circuitry to achieve the same end.

Additionally, at least in part, the electronic trip unit of the circuit breaker of the present invention can be embodied in the form of computer-implemented processes and apparatuses for practicing those processes. The present invention can, in part, also be embodied in the form of computer program code containing instructions embodied in tangible media, such as floppy diskettes, CD-ROM's, hard drives, or any other computer-readable storage medium, wherein, when the computer program code is loaded into and executed by a computer or circuit breaker microprocessor, the computer or circuit breaker microprocessor becomes an apparatus for practicing the invention. The present invention can also be embodied in the form of computer program code, for example, whether stored in a storage medium, loaded into and/or executed by a computer or circuit breaker microprocessor, or transmitted over some transmission medium, such as over electrical wiring or cabling, through fiber optics, or via electromagnetic radiation, wherein, when the computer program code is loaded into and executed by a computer or circuit breaker microprocessor, the computer or circuit breaker microprocessor becomes an apparatus for practicing the invention. When implemented on a general-purpose microprocessor, the computer program code segments configure the microprocessor to create specific logic circuits.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A trip unit comprising:
   phase protection circuits;
   a ground fault protection circuit; and,
   a phase current qualification circuit intermediate the phase protection circuits and the ground fault protection circuit, wherein the phase current qualification circuit includes circuitry for determining a minimum ground fault setting for detected phase currents.

2. The trip unit of claim 1 wherein the ground fault protection circuit includes a customer adjustable threshold mechanism for inputting a customer adjustable threshold.

3. The trip unit of claim 2 further comprising a maximum ground fault threshold selector for receiving the customer adjustable threshold and the minimum ground fault setting, determining which of the customer adjustable threshold and the minimum ground fault setting has a larger value, and setting the larger value as ground fault threshold.

4. The trip unit of claim 3 wherein the ground fault protection circuit further comprises a summing amplifier for receiving detected phase currents.

5. The trip unit of claim 4 wherein residual current, from the summing amplifier, and the ground fault threshold are sent to a first summer.

6. The trip unit of claim 5 wherein the phase current qualification circuit includes a maximum phase current selector for receiving phase currents from the phase protection circuits and determining which of the phase currents received from the phase protection circuits is largest for determining a maximum value of the phase currents.

7. The trip unit of claim 6 wherein the phase current qualification circuit includes a second summer for receiving the maximum value of the phase currents from the maximum phase current selector and stored phase current error levels from a storage area located in the phase current qualification circuit.

8. The trip unit of claim 7 including memory within a microprocessor, the minimum ground fault setting stored in the memory with a plurality of other minimum ground fault settings, the minimum ground fault setting selected from the memory based on an output of the second summer.

9. The trip unit of claim 1 wherein the phase current qualification circuit includes a storage area for phase current error levels.

10. The trip unit of claim 1 further comprising a maximum ground fault threshold selector for receiving a customer adjustable threshold and the minimum ground fault setting, determining which of the customer adjustable threshold and the minimum ground fault setting has a larger value, and setting the larger value as ground fault threshold.

11. The trip unit of claim 1 wherein the ground fault protection circuit comprises a summing amplifier for receiving detected phase currents.

12. The trip unit of claim 1 wherein the ground fault protection circuit comprises a summer for receiving residual current and a ground fault threshold.

13. The trip unit of claim 1 wherein the phase current qualification circuit includes a maximum phase current selector for receiving phase currents from the phase protection circuits and determining which of the phase currents received from the phase protection circuits is largest for determining a maximum value of phase currents.

14. The trip unit of claim 13 wherein the phase current qualification circuit includes a summer for receiving the maximum value of the phase currents from the maximum phase current selector and stored phase current error levels from a storage area located in the phase current qualification circuit.

15. The trip unit of claim 1 including a memory within a microprocessor, the minimum ground fault setting stored in the memory with a plurality of other minimum ground fault settings.

16. A trip unit comprising:
   means for determining a minimum ground fault setting for detected phase currents;
   means for comparing the minimum ground fault setting to a customer provided threshold;
   means for determining which of the minimum ground fault setting and the customer provided threshold has a larger value and setting the larger value as a maximum value; and,
   means for utilizing the maximum value as a ground fault threshold.

17. A circuit breaker comprising:
   a plurality of phases;
   a current transformer for each phase;
   phase protection circuits receiving signals from each current transformer;
   a ground fault protection circuit receiving signals from each current transformer; and,
   a phase current qualification circuit intermediate the phase protection circuits and the ground fault protection circuit, wherein the phase current qualification circuit includes circuitry for determining a minimum ground fault setting for detected phase currents.

18. The circuit breaker of claim 17 further comprising:
a neutral path; and,
a current transformer for the neutral path;
wherein the phase protection circuits and the ground fault protection circuit receive signals from the current transformer for the neutral path.

19. The circuit breaker of claim 17 further comprising a set of separable contacts for each phase.

20. The circuit breaker of claim 17 further comprising phase amplifiers processing outputs of the current transformers as signals for the phase protection circuits.

21. The circuit breaker of claim 17 further comprising a maximum ground fault threshold selector for receiving a customer adjustable threshold and the minimum ground fault setting, determining which of the customer adjustable threshold and the minimum ground fault setting has a larger value, and setting the larger value as ground fault threshold.

22. The circuit breaker of claim 17 further comprising a trip actuator for receiving a trip signal from the ground fault protection circuit.

* * * * *